United States Patent [19]
Yamasaki et al.

[11] Patent Number: 5,521,893
[45] Date of Patent: May 28, 1996

[54] DATA RECORDING APPARATUS

[75] Inventors: Yoshimori Yamasaki, Kanagawa; Takayoshi Chiba; Hideki Kobunaya, both of Tokyo; Yutaka Ishikawa, Kanagawa, all of Japan

[73] Assignees: Sony Corporation; NEC Corporation, both of Tokyo, Japan

[21] Appl. No.: 241,188

[22] Filed: May 11, 1994

[30]  Foreign Application Priority Data

May 14, 1993  [JP]  Japan .................................. 5-136743

[51] Int. Cl.$^6$ .................................................. G11B 7/00
[52] U.S. Cl. .................. 369/48; 369/47; 369/54; 369/58
[58] Field of Search ..................... 369/84, 53, 54, 369/58, 59, 60, 44.32, 13, 47, 49, 48

[56]  References Cited

U.S. PATENT DOCUMENTS

| | | | |
|---|---|---|---|
| 4,979,158 | 12/1990 | Yoda | 369/13 |
| 5,099,464 | 3/1992 | Maeda | 369/13 |
| 5,212,678 | 5/1993 | Roth et al. | 369/60 |
| 5,224,087 | 6/1993 | Maeda et al. | 369/116 X |
| 5,331,616 | 7/1994 | Morita et al. | 369/54 X |
| 5,410,526 | 4/1995 | Maeda et al. | 369/60 X |

*Primary Examiner*—Georgia Y. Epps
*Assistant Examiner*—Muhammad N. Edun
*Attorney, Agent, or Firm*—William S. Frommer; Alvin Sinderbrand

[57]  ABSTRACT

A disc drive such as an optical magnetic disc drive latches status information IDS, and IDOST to DATST for operational status at a timing when an abnormality occurs, and repeats recording based upon latched status information IDS, and IDOST to DATST, thereby reducing retry time.

14 Claims, 4 Drawing Sheets

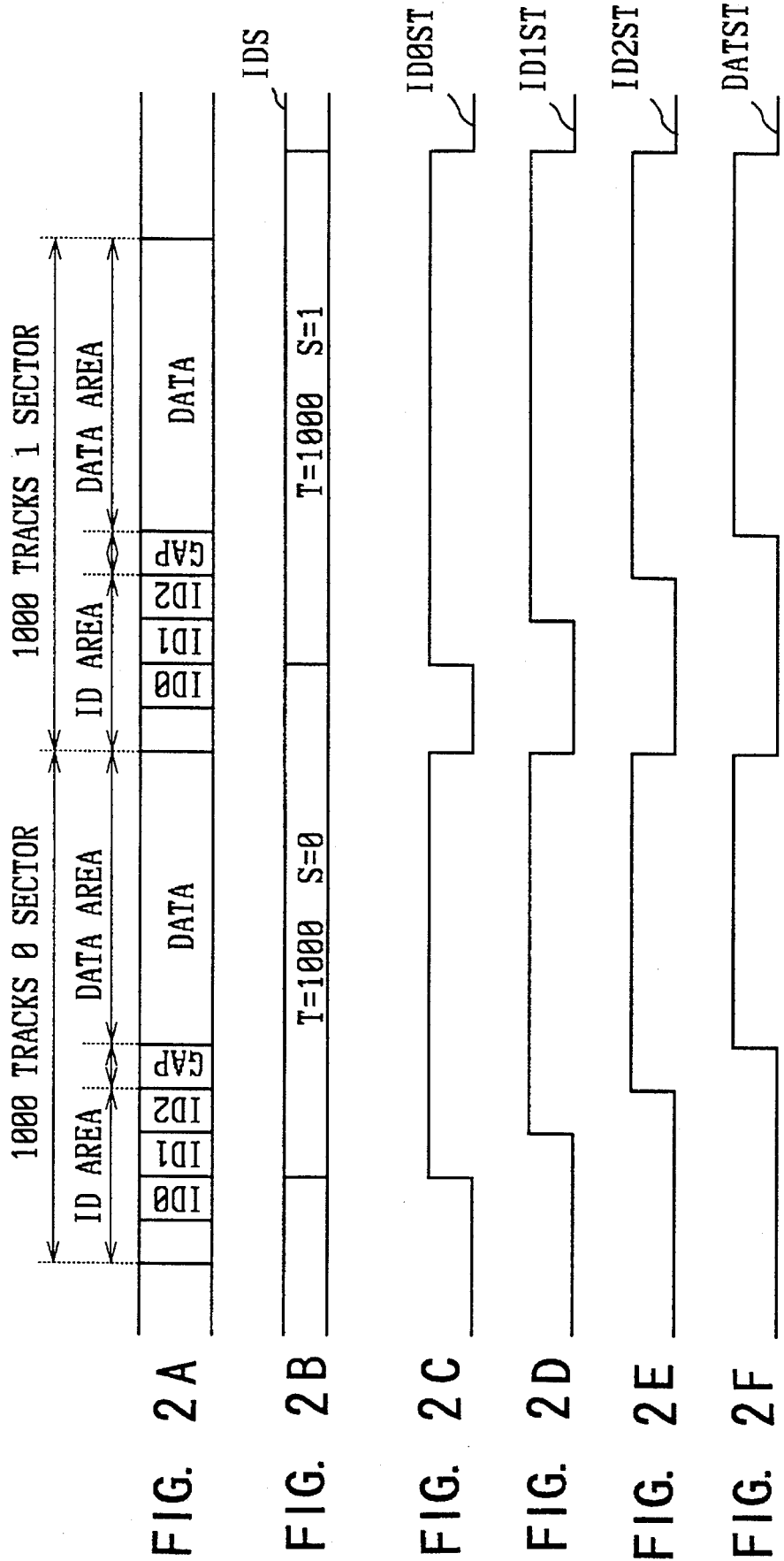

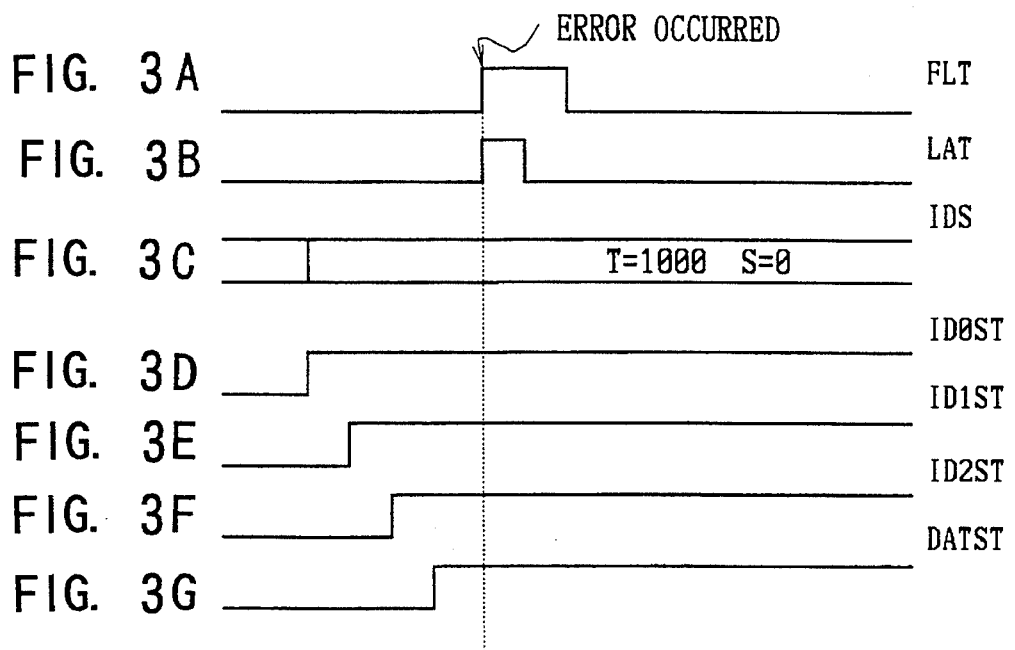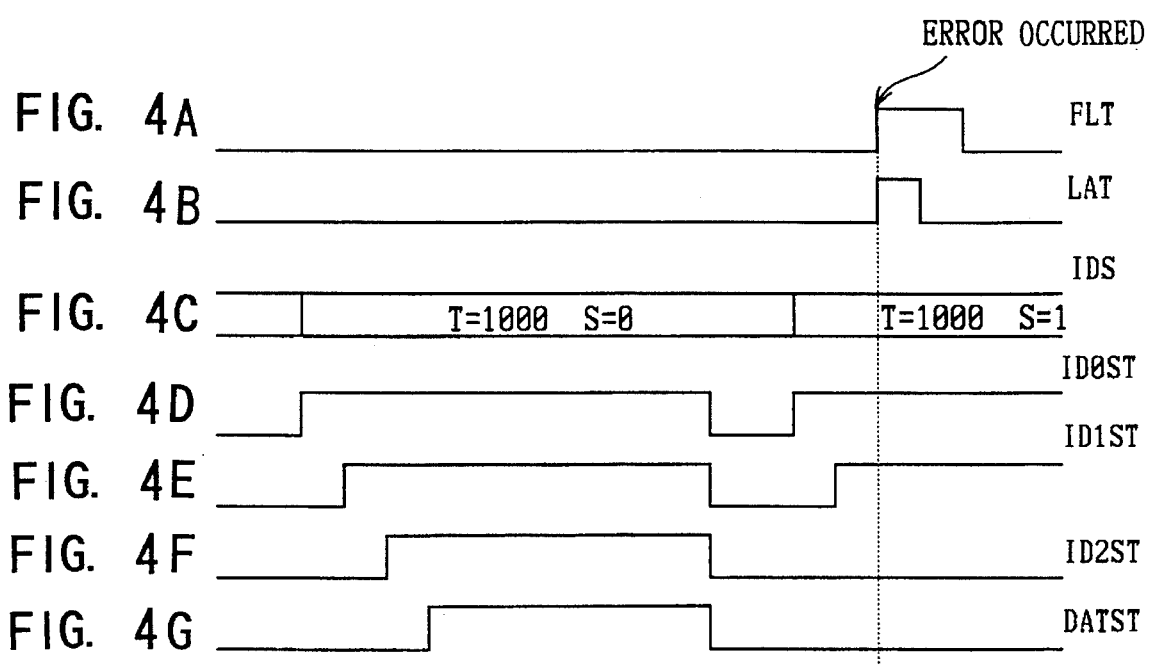

DATA RECORDING APPARATUS

BACKGROUND OF THE INVENTION

1. Field of the Invention

This invention relates to a data recording apparatus for erasing data recorded on a recording medium then recording new data on the portion thus erased, and more particularly, to an optical magnetic disc apparatus for erasing data recorded on an optical magnetic disc and then recording new data on the portion thus erased.

2. Description of the Related Art

Conventionally, when accessing an optical magnetic disc, an of optical magnetic disc apparatus monitors for abnormalities such as a tracking error and retries write operations as needed.

When a host computer issues a write command, an optical magnetic disc apparatus erases the region for recording data, and then sequentially thermal magnetic records the data outputted from the host computer on a portion where the previous data has been erased.

At that time, the optical magnetic disc apparatus monitors a signal, such as tracking error signal, focus error signal, etc., to detect whether or not there is any abnormality in erasing processing or recording processing. When any abnormality is detected, the optical magnetic disc apparatus retries the erase or record operation.

Therefore, the optical magnetic disc apparatus is capable of recording and reproducing data without losing valuable data.

In a case where the optical magnetic disc apparatus retries writing data in the above manner, an abnormality may occur at only a small last part of a region to be erased, although the erasure has been normally performed to that point. In this case, it is wasteful to repeat the erasing operation from the beginning.

If such wasted time can be reduced the access time to the optical magnetic disc apparatus becomes shorter, thereby improving the usability of the optical magnetic disc apparatus.

However, when an abnormality is detected, the conventional optical magnetic disc apparatus interrupts a system control circuit to suspend the current processing, because the abnormal processing has the highest priority level. Therefore, detection of the abnormality unavoidably results in a time delay.

In addition, the time delay varies corresponding to the operation being executed at that time, such as during erasing, during succeeding from the erasing operation to the recording operation, etc., so that a conventional optical magnetic disc apparatus cannot precisely determine the processing time point when an abnormality has occurred.

Therefore, in the conventional optical magnetic disc apparatus, the problem is that it unavoidably wastes time repeating retries of write processing.

SUMMARY OF THE INVENTION

In view of the foregoing, an object of this invention is to provide a data recording apparatus in which the problems described above are solved. More specifically, an object of this invention is to provide a data recording apparatus for erasing data recorded in a desired area on the recording medium, and then recording new data thereon when the position data region showing position information on the recording medium and the recording data region where desired data is recorded are formed at predetermined intervals, said data recording apparatus comprising: access means for accessing the recording medium; status information generating means for generating a status information signal showing the operational status based on an output signal with the access means; abnormality detection means for detecting an operational abnormality in the data recording apparatus to generate an abnormality detection signal; latch means for latching the status information signal on the basis of the abnormality detection signal; and control means for selectively executing the first operation to once stop the recording operation when the abnormality detection signal is generated during that recording operation and simultaneously to erase the recording data already recorded and then perform recording again based on the status information signal latched by the latch means, and a second operation to record only the remaining unrecorded data.

Another object of this invention is to provide a data recording apparatus in which said control means selectively executes a third operation to perform recording operation without performing erasing operation based upon the status information signal latched by the latch means when the abnormality detection signal is generated during the data erasing operation, and a fourth operation to carry out an erasure again from the data which is at the abnormality detection signal was generated, and then perform recording operation.

According to this invention, the status information showing the operational status is latched at the timing at which an abnormality occurs, and the recording operation is repeated based on this latched status information, so that wasteful erasure or recording can be omitted and the data can be recorded correctly. Therefore, a disc apparatus capable of reducing processing time and improving reliability can be obtained.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2F are signal waveform diagrams explaining status information;

FIGS. 3A to 3G are signal waveform diagrams explaining operation of signals corresponding to status information;

FIGS. 4A to 4G are signal waveform diagrams showing a case where erasure is not required.

DETAILED DESCRIPTION OF THE EMBODIMENT

Figure 1:
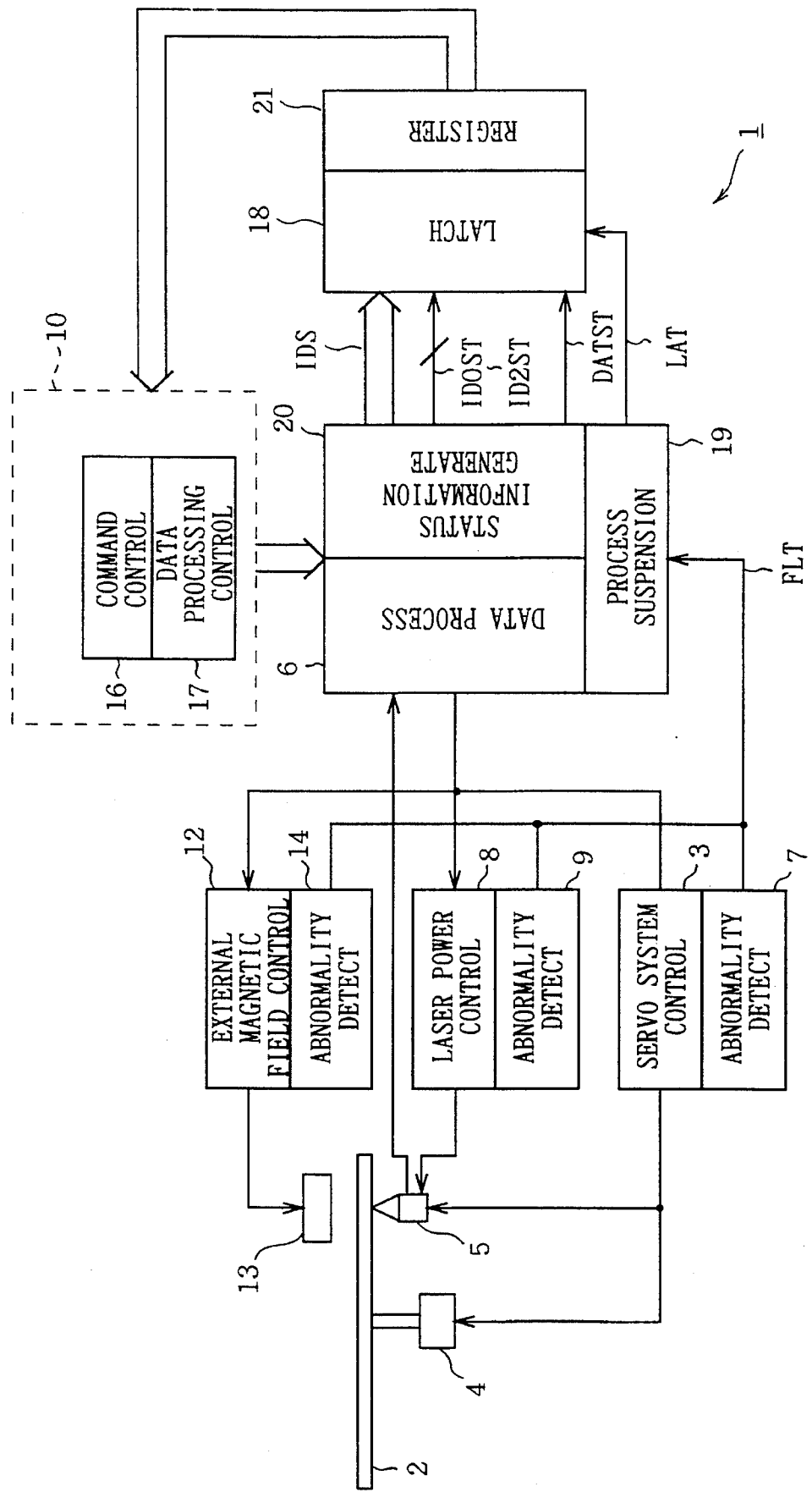
FIG. 1 is a block diagram illustrating an optical magnetic disc apparatus according to an embodiment of this invention.

Preferred embodiments of this invention will be described with reference to the accompanying drawings:

In FIG. 1, 1 generally shows an optical magnetic disc apparatus. This optical magnetic disc apparatus 1 thermomagnetically records various data on an optical magnetic disc 2, and reproduces the recorded data.

That is, the optical magnetic disc 2 is rotationally driven at a predetermined rotational speed by a spindle motor 4 using a servo system control circuit 3.

Further, based on tracing and focusing error signals obtained through the pickup 5, the servo system control circuit 3 makes an optical pickup 5 seek at a predetermined position of the optical magnetic disc 2, and controls the tracking of and the focusing of the optical pickup 5.

The servo system control circuit 3 has an abnormality detection circuit 7. This abnormality detection circuit 7 monitors tracking error signal and focusing error signal, and outputs error signal FLT when any abnormality, such as track jumping, off-tracking, defocusing, etc., is detected.

A laser power control circuit 8 switches the amount of the light beam irradiating the optical magnetic disc 2 during reproducing, erasing, and recording by controlling the amount of light from a laser diode built into the optical pickup 5, based on a control code supplied from the data processing circuit 6. The laser power control circuit 8 switches the irradiation timing of the light beam at reproducing, erasing, and recording, respectively.

This laser power control circuit 8 has an abnormality detection circuit 9. This abnormality detection circuit 9 monitors the amount of light beam from the laser diode, and outputs error signal FLT when this amount of light beam exceeds a predetermined value.

Further, when error signal FLT is supplied during recording or erasing, the laser power control circuit 8 immediately switches the amount of light beam from the laser diode to the value required during reproducing. Thereby, valuable data cannot be erased inadvertently, for example, in case of off-tracking, etc..

An external magnetic field control circuit 12 drives a magnetic head 13 retained in opposition to the optical pickup 5 with the optical magnetic disc 2 located therebetween. The external magnetic field control circuit 12 controls the projection of a magnetic field for erasing which has a predetermined polarity on to the optical magnetic disc 2 during erasing, and forms a modulated magnetic field corresponding to recorded data outputted from the data processing circuit 6 during recording.

Thereby, the optical magnetic disc apparatus 1 can record desired data according to the thermomagnetic recording method.

In the reverse operation the optical magnetic disc apparatus 1 uses the optical pickup 5 to receive reflected light using the Kerr effect in order to reproduce recorded data.

The external magnetic field control circuit 12 has an abnormality detection circuit 14 which outputs error signal FLT when it detects an abnormality such as the inability to drive the magnetic head 13.

During recording, the data processing circuit 6 modulates data supplied from the host computer using a specified modulation method, and supplies modulated data to the external magnetic field control circuit 12. This causes the optical magnetic disc apparatus 1 to form a modulated magnetic field corresponding to this data to record the data on the optical magnetic disc 2.

The data processing circuit 6 reproduces the signal output by the optical pickup 5 to detect a sector ID, controls the servo system control circuit 3 or laser power control circuit 8, depending upon the control code supplied from the system controller 10, and records this data at a specified location.

Prior to this recording, the data processing circuit 6 controls the servo system control circuit 3, laser power control circuit 8, and external magnetic field control circuit 12 to erase, in advance the data record area on which data is to be recorded.

During reproduction, however, the data processing circuit 6 inputs a reproduced signal from the optical pickup 5 and amplifies the signal to obtain recorded data from the optical magnetic disc 2.

The data processing circuit 6 controls the servo system control circuit 3 and laser power control circuit 8 to reproduce specified data according to a request from the host computer.

In order to perform a reproduction, erasure, and recording series, the system controller 10 uses a command analysis section 16 to analyze a control command from the host computer, and transmits a control code to the data processing circuit 6 via the data processing control block 17 based upon the result of the analysis. This causes the operation mode of the overall system to be switched, and then the ID of the target, a trigger to initiate, and so on are set.

When error signal FLT is generated to suspend reproduction, erasure, or recording, the system controller 10 supplies a control code to the data processing circuit 6 to execute a retry.

This ensures that the optical magnetic disc apparatus 1 records and reproduces desired data correctly, even if a track jump occurs during recording or reproduction.

The system controller 10 executes a retry based upon the status information latched in the latch circuit 18, thereby reducing wasted processing time.

That is, the processing suspension circuit 19 suspends the data processing being carried out by the data processing circuit 6, if error signal FLT is generated during reproduction, erasure, or recording. Then, the data processing circuit 6 supplies a control code to the servo system control circuit 3, laser power control circuit 8, and external magnetic field circuit 12.

This allows the optical magnetic disc apparatus 1 to immediately suspend processing if an abnormality occurs during reproduction, erasure, or recording.

If error signal FLT rises to a high level, the processing suspension circuit 19 outputs latch signal LAT to the latch circuit 18.

The status information generation circuit 20 generates status information about the operational status of the optical magnetic disc apparatus 1. The status information consists of IDS information IDS (FIGS. 2A and 2B) indicating the scanning location of the light beam with track number T and sector number S corresponding to the track format of the optical magnetic disc (FIG. 2A), and sector information ID0ST to DATST (FIGS. 2C to 2F) composed of identification data for an ID area and a data record area recorded at the beginning of each sector (FIGS. 2C to 2F). The status information generation circuit 20 generates this status information based upon address data detected by the data processing circuit 6. The ID area is previously recorded on the optical magnetic disc as data formed by pits.

For first sector information ID0ST, the signal level is kept low during a light beam scanning duration from a starting position of the ID record area to a finishing position of the first ID information ID0 out of three pieces of ID information. For second sector information ID1ST, the signal level is kept low during the light beam scanning duration from a start position of the ID record area to a finishing position of the second ID information ID1. For third sector information ID2ST, the signal level is kept low during the light beam scanning duration from a starting position of the ID record area to a finishing position of the third ID information ID2. For fourth sector information DATST, the signal level is kept low during the light beam scanning duration from a starting position of the ID record area to a finishing position of a gap area following to the ID record area.

This allows the optical magnetic disc apparatus 1 to use the latch circuit 18 so as to latch status information IDS to DATST based upon latch signal LAT, thereby allowing the processing status of the optical magnetic disc apparatus 1 to be known if an abnormality occurs.

As shown in FIGS. 3A to 3G, if error signal FLT (FIG. 3A) is driven high to suspend processing, latch signal LAT (FIG. 3B) rises to a high level. Therefore, it can be determined from the IDS information (FIG. 3C) that the abnormality has occurred while track 1000 and sector 0 has been scanned. In addition, since first to fourth sector information ID0ST to DATST (FIGS. 3D to 3G) are all kept high, it can be determined that the abnormality has occurred during recording, reproduction, or erasure.

If an abnormality occurs during erasure and is then detected, it will be recognized that data should be erased from the beginning of the track 1000 and sector 0. If an abnormality occurs during recording and is then detected, it will be recognized that data should be erased from the track 1000 and sector 0, then new data must be recorded thereon.

If error signal FLT (FIG. 4A) and latch signal LAT (FIG. 4B) rise to a high level at a timing shown in FIGS. 4A to 4G, it can be determined from the IDS information (FIG. 4C) that the abnormality has occurred while track 1000 and sector 1 has been scanned. Since the first and second sector information ID0ST and ID1ST (FIGS. 4D and 4E) have been kept at high levels and the third and the fourth sector information ID2ST and DATST (FIGS. 4F and 4G) have been kept at low levels, it can also be determined that the abnormality has occurred at the timing when the light beam has been scanning the ID record area where the third ID information was recorded.

Therefore, since the erasing operation has not been performed on the area where actual data was to be recorded, the erasure, recording, or reproduction may be re-started from the beginning the of track 1000 and sector 1.

Thus, the system controller 10 takes in the status information via a register 21 to determine the processing status to execute a retry.

Since the status information has been generated based upon the processing status and this information has been latched at the timing when the abnormality has occurred, the system controller 10 can use this latched information to determine the processing status when the abnormality occurred, even if there is a time delay between the suspension of processing and the determination of the time at which the abnormality occurred.

Therefore, the optical magnetic disc apparatus 1 executes a retry based upon the result of determination, thereby reducing wasted time.

Figure 5:
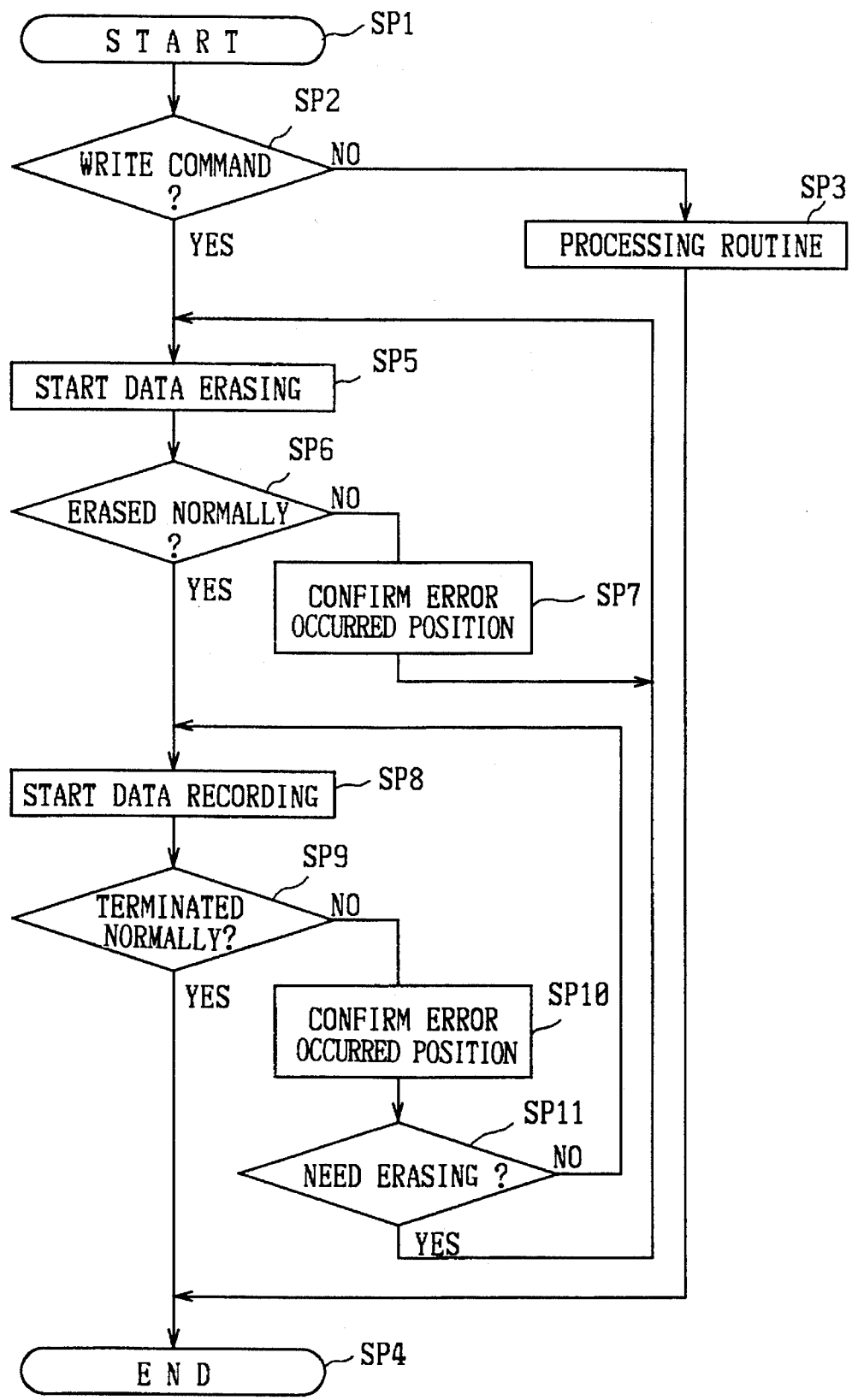
FIG. 5 is a flow chart explaining a retry.

The above operation will be described with reference to FIG. 5. As shown in FIG. 5, when the system controller 10 is supplied with a control command from the host computer, it proceeds to step SP2 from step SP1 to determine whether or not the command is a "write", using the command analysis section 16. If the command is a "read", the result is negative at step SP2, then the system controller 10 proceeds to step SP3. The system controller 10 then issues a control code from the processing control block 17 and executes a processing routine corresponding to the control command, thereafter proceeding to step SP4 to terminate this procedure.

In step SP3, if an abnormality occurs during reproduction and error signal FLT rises to a high level, the status information latched by the latch circuit 18 is loaded to determine the time at which the abnormality occurred, then to execute a retry based upon the result of the timing determination. If, for example, the abnormality occurred at the timing shown in FIGS. 3A to 3G or FIGS. 4A to 4G, a control code is issued to the data processing circuit 6 to read data from the beginning of the track 1000 and sector 0, or the track 1000 and sector 1, respectively.

This allows the optical magnetic disc apparatus 1 to re-start the reproduction from the sector at which data was not reproduced correctly, thereby reducing wasted retry time and avoiding the reproduction of some data already correctly reproduced. Therefore, an access time during a read operation can be reduced. In addition, data can be reproduced correctly to improve the reliability of the overall apparatus.

If a write command is issued by the host computer, however, the system controller 10 proceeds to step SP5 from step SP2 and issues a control code to the data processing circuit 6.

The system controller 10 then controls the external magnetic field control circuit 12 to apply a magnetic field to the optical magnetic disc 2, so as to execute an erasing operation. It also controls the servo system control circuit 3 to position the optical pickup 5 and the magnetic head 13 at the sector to be processed. When positioning is finished, the data processing circuit 6 detects the sector and the laser power control circuit 8 switches the amount from light of the light beam to the value required for erasure at the time when the sector is scanned by the light beam.

Then, the system controller 10 proceeds to step SP6 to determine whether or not the sector has been erased correctly by determining whether or not error signal FLT has risen to a high level to cause an interrupt. The optical magnetic disc drive 10 erases all of a plurality of sectors required for recording. If the result is negative at step SP6, the system controller 10 proceeds to step SP7 to load status information latched by the latch circuit 18, thereby determining the processing status at the time when the abnormality occurred. It then returns to step SP5 to execute a retry based upon the result of the timing determination. If the abnormality has occurred at the timing shown in FIGS. 3A to 3G or FIGS. 4A to 4G, the system controller 10 issues a control code to the data processing circuit 6 to erase the data from the beginning of the track 1000 and sector 0 or of the track 1000 and sector 1, respectively.

This allows the optical magnetic disc apparatus 1 to re-start erasure from the sector at which data was not erased (deleted) correctly, thereby reducing wasted retry time and avoiding the erasure of some data areas already correctly erased. Consequently, access time during a write operation is reduced.

However, if the result is affirmative at step SP6, the system controller 10 proceeds to step SP8 to start recording data. That is, the system controller 10 controls the external magnetic field control circuit 12 to switch the magnetic field of the magnetic head 13 to the polarity provided during recording by issuing a control code to the data processing circuit 6. The system controller 10 then controls the servo system control circuit 3 to position the optical pickup 5 and the magnetic head 13 to the sector at be processed. When positioning is completed, the data processing circuit 6 detects the sector, then the system controller 10 controls the laser power control circuit 8 to switch the amount of light of the light beam to the value used for recording at the time when the sector is scanned by the light beam.

Then, the system controller 10 proceeds to step SP9 to determine whether or not the sector has been erased correctly by determining whether or not error signal FLT has risen to a high level to cause an interrupt. If the result is negative at step SP9, the system controller 10 proceeds to step SP10 to load status information latched by the latch circuit 18, thereby determining the processing status of the time when the abnormality occurred.

The system controller 10 then proceeds to step SP11 to determine whether or not a new erasure is required, based upon the result of the determination. For example, if an abnormality has occurred at the timing shown in FIGS. 3A to 3G, the controller 10 determines that recorded data should be erased from the sector scanned at the time when the abnormality occurred, then new data must be recorded thereon. It then proceeds to step SP5 to erase, based on the information latched in the latch circuit 18, only data from the sector which was being processed when the abnormality occurred. Next, it proceeds to step SP6.

That is, a conventional optical magnetic disc apparatus has been unable to determine the sector being recorded when an abnormality occurred, so that all sectors considered to be erasure targets are erased. However, if, as in this embodiment, data is erased only from the sector which was being processed when the abnormality occurred, based upon the information latched in the latch circuit 18, wasted erasure time is reduced.

This also avoids the recording of data in an area erased incorrectly.

Thus, the optical magnetic disc apparatus 1 can erase the sector in which data was not recorded correctly and then record new data thereon, thereby reducing wasted retry time and recording data correctly. Consequently, access time during a write operation can be reduced.

However, since data has not yet been recorded when an error signal has been generated while the signal for fourth sector information DATST shown in FIG. 2F, has kept low, the data need not be erased from the sector processed when the abnormality has occurred. Therefore, the system controller 10 returns to step SP8 to re-start recording data in the sector being processed when the abnormality occurred.

The optical magnetic disc apparatus 1 can switch a write retry using, as a reference, the location where the abnormality has occurred, in order to omit a process for erasing the sector processed when the abnormality has occurred. Consequently, the time required to perform a write can be reduced.

If the result is affirmative at step SP9, the system controller 10 proceeds to step SP4 to terminate the procedure without executing any retry.

In the above configuration, the status information for the scanning location of the light beam is generated to latch this information at the timing when an abnormality occurs, thereby allowing the location where the abnormality has occurred to be detected correctly. The retry can be switched depending upon where the abnormality has occurred in order to reduce a processing time.

In the above embodiment, IDS information and first to fourth sector information are used to specify an irradiation location. However, this invention is not only limited to this, but reference data may be generated as needed to specify the location where the light beam is irradiated.

Further, in the above embodiment, the information for the location where the light beam is irradiated is latched as status information. However, this invention is not only limited to this, but identification data for operation modes such as recording and erasure may also be latched to repeat operations such as recording based upon the result of latching.

Further, in the above embodiment, three pieces of ID information are used. However, these information are not only limited to this, but may apply to optical magnetic disc apparatuses with different recording formats.

Further, the above embodiment is applied to the optical magnetic disc apparatus. However, this invention is not only limited to this, but may apply to different disc apparatuses, such as optical and magnetic disc apparatuses.

While this invention has been described in connection with the preferred embodiments thereof it will be obvious to those skilled in the art that various changes and modifications may be made which fall within the true spirit and scope of the invention as defined in the appended claims.

What is claimed is:

1. A data recording apparatus for recording new data in a desired record data area of a recording medium after erasing data recorded in said desired record data area, a plurality of position data areas representing information in locations on the recording medium and a plurality of record data areas where desired data is recorded being formed in said recording medium at a specified interval, said data recording apparatus comprising:

access means for accessing said recording medium;

status information generating means for generating a status information signal for an operational status based upon an output signal for said access means;

abnormality detecting means for detecting an operational abnormality in said data recording apparatus to generate an abnormality detection signal;

latch means for latching said status information signal based upon said abnormality detection signal; and control means for stopping recording operation when said abnormality detection signal is generated during the recording operation and, based upon said status information signal latched by said latch means, selectively performing a first operation to record the record data after erasing data recorded in said desired record data area, a second operation to record only a remaining data which is not recorded to said recording medium, a third operation to perform said recording without erasure when said abnormality detection signal is generated during data erasure, and a fourth operation to carry out erasure again of a data area being processed when the abnormality detection signal is generated before performing said recording.

2. A data recording apparatus for erasing and recording data areas of a recording medium, said recording medium including identification areas interspersed with said data areas, comprising:

recording means operable for recording data on said recording medium in a data area;

erasing means operable for erasing data from said data area;

means for reading identification data from an identification area corresponding to said data area;

generating means for generating a status information signal corresponding to the identification data;

error detecting means for detecting an operational abnormality in said apparatus and for generating an error signal;

latch means, responsive to said error signal, for latching said status information signal; and control means, responsive to said error signal, for interrupting the operation of said apparatus and, as a function of said status information signal latched in said latch means, for selectively controlling said recording means and said erasing means to resume recording data on said data area without erasing the data area or to erase said data area and then record data on said data area.

3. Apparatus according to claim 2 wherein said control means further selectively controls said recording means and said erasing means, as a function of said status information signal, to begin recording data on said data area.

4. Apparatus according to claim 2 wherein said control means further selectively controls said recording means and said erasing means, as a function of said status information signal, to begin erasing said data area.

5. Apparatus according to claim 2 wherein said control means further selectively controls said recording means and said erasing means, as a function of said status information signal, to resume erasing said data area.

6. Apparatus according to claim 2 wherein said control means further selectively controls said recording means and said erasing means, as a function of said status information signal, to repeat the recording of data on said data area.

7. Apparatus according to claim 2 wherein said status information signal indicates a location on said medium.

8. Apparatus according to claim 2 wherein said means for reading further reads identification data from a data area.

9. Apparatus according to claim 2 wherein said recording medium is a disk shaped medium.

10. Apparatus according to claim 9 wherein said recording medium is a magneto-optical disk.

11. Apparatus according to claim 10 further comprising means for applying an external magnetic field to said disk and wherein said error detecting means detects an abnormality in the operation of said means for applying an external magnetic field.

12. Apparatus according to claim 10 further comprising laser means for irradiating said disk and wherein said error detecting means detects an abnormality in the operation of said laser means.

13. Apparatus according to claim 10 further comprising drive means for rotating said disk and wherein said error detecting means detects an abnormality in the operation of said drive means.

14. A data recording and reproducing apparatus for erasing, recording and reproducing data areas of a recording medium, said recording medium including identification areas interspersed with said data areas, comprising:

recording means operable for recording data on said recording medium in a data area;

reproducing means operable for reproducing data from said data area;

erasing means operable for erasing data from said data area;

means for reading identification data from an identification area corresponding to said data area;

generating means for generating a status information signal corresponding to the identification data;

error detecting means for detecting an operational abnormality in said apparatus and for generating an error signal;

latch means, responsive to said error signal, for latching said status information signal; and control means, responsive to said error signal, for interrupting the operation of said apparatus and, as a function of said status information signal latched in said latch means, for selectively controlling said recording means, said reproducing means and said erasing means to resume recording data on said data area without erasing the data area or to erase said data area and then record data on said data area or to resume reproducing data from said data area.

\* \* \* \* \*